United States Patent
Itoh et al.

(10) Patent No.: US 9,894,007 B2
(45) Date of Patent: Feb. 13, 2018

(54) PACKET TRANSFER PROCESSING APPARATUS AND METHOD

(71) Applicant: NIPPON TELEGRAPH AND TELEPHONE CORPORATION, Tokyo (JP)

(72) Inventors: Yasuyuki Itoh, Tokyo (JP); Sadayuki Yasuda, Tokyo (JP); Shoko Ohteru, Tokyo (JP); Masami Urano, Tokyo (JP); Tsugumichi Shibata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 116 days.

(21) Appl. No.: 14/898,720

(22) PCT Filed: Jun. 23, 2014

(86) PCT No.: PCT/JP2014/066523
§ 371 (c)(1),
(2) Date: Dec. 15, 2015

(87) PCT Pub. No.: WO2014/208489
PCT Pub. Date: Dec. 31, 2014

(65) Prior Publication Data
US 2016/0127249 A1     May 5, 2016

(30) Foreign Application Priority Data
Jun. 24, 2013   (JP) .................................. 2013-131546

(51) Int. Cl.
*H04L 12/873*    (2013.01)
*H04L 12/66*    (2006.01)
(Continued)

(52) U.S. Cl.
CPC ............ *H04L 47/522* (2013.01); *H04L 12/46* (2013.01); *H04L 12/4625* (2013.01);
(Continued)

(58) Field of Classification Search
None
See application file for complete search history.

(56) References Cited

U.S. PATENT DOCUMENTS 6,499,072 B1 * 12/2002 Frank .................. G06F 13/4059
710/100
2002/0087712 A1 * 7/2002 Awasthi .................. H04L 47/10
709/233
(Continued)

FOREIGN PATENT DOCUMENTS

| JP | H06-069913 A | 3/1994 |
| JP | 2004-178056 A | 6/2004 |
| JP | 2007-194991 A | 8/2007 |

*Primary Examiner* — Kodzovi Acolatse
(74) *Attorney, Agent, or Firm* — Blakely Sokoloff Taylor & Zafman LLP

(57) ABSTRACT

A write preference determination unit (30A) compares a reception rate of packets received from the lines of a first network (NW1) with a reception rate threshold for write preference determination, and in a case where the reception rate exceeds the reception rate threshold, determines that preference of a write operation is necessary. A write preference control unit (30B) increases, out of a total access bandwidth of a packet buffer (BUF), a write bandwidth for a packet write operation to the packet buffer (BUF) as compared to a read bandwidth for a packet read operation from the packet buffer (BUF) in a case where the write preference determination unit (30A) determines that the preference is necessary, thereby preferentially executing the packet write operation to the packet buffer. This suppresses occurrence of linked discard of reception packets caused by a shortage of the write bandwidth.

10 Claims, 8 Drawing Sheets

(51) Int. Cl.
  *H04L 12/46*    (2006.01)
  *H04L 12/865*   (2013.01)
  *H04L 12/835*   (2013.01)
  *H04L 12/861*   (2013.01)
  *H04L 12/879*   (2013.01)

(52) U.S. Cl.
  CPC .............. *H04L 12/66* (2013.01); *H04L 47/30* (2013.01); *H04L 47/6275* (2013.01); *H04L 49/901* (2013.01); *H04L 49/9084* (2013.01)

(56)                References Cited

U.S. PATENT DOCUMENTS

2007/0250741 A1* 10/2007 Ehlers ................. G06F 11/0745
                                                    714/43
2015/0271287 A1*  9/2015 Islam .................. H04L 67/2847
                                                    711/137

* cited by examiner

PACKET TRANSFER PROCESSING APPARATUS AND METHOD

TECHNICAL FIELD

The present invention relates to a packet communication technique and, more particularly, to a buffer control technique of temporarily accumulating a reception packet in the buffer of a packet transfer processing apparatus such as a router or a switch that concentrates lines of an access network and connects them to a core network.

BACKGROUND ART

When placed at a position to concentrate lines of an access network and connect them to a core network, a packet transfer processing apparatus such as a router or switch performs inbound processing of receiving a packet from the access network side where a user apparatus is connected and outbound processing of transmitting a packet to the access network side.

As shown in FIG. 8, a packet transfer processing apparatus 50 includes a register file 51, a selector 52, a data write unit 53, a packet buffer BUF, and a data read unit 54 as main functional units used for inbound processing.

The register file 51 is provided for each line from a first network NW1 formed from an access network or the like, and has a function of receiving a packet from each line and holding it in the internal register of its own.

The selector 52 has a function of selecting a packet read out of the register file 51.

The data write unit 53 has a function of inputting a packet selected by the selector 52 to a write port PW of the packet buffer BUF.

The packet buffer BUF is formed from a dual port type SRAM including the write port PW and a read port PR, and has a function of writing a packet input from the data write unit 53 to the write port PW in a storage area designated by write address information out of the SRAM in accordance with a write instruction, and a function of reading out a packet from a storage area designated by read address information out of the SRAM and outputting the packet from the read port PR to the data read unit 54 in accordance with a read instruction.

The data read unit 54 has a function of transmitting a packet read out of the packet buffer BUF to a second network NW2.

As shown in FIG. 8, the packet transfer processing apparatus 50 also includes a FIFO management unit 61, a read and selection control unit 62, a write control unit 63, a read control unit 64, and an address control unit 65 as main functional units used for access control of the packet buffer BUF in the inbound processing.

The FIFO management unit 61 has a function of managing the amount of packets and address information written in each register file 51.

The read and selection control unit 62 has a function of instructing the register file 51 to read out a packet stored in the register file 51 in accordance with the amount of packets and address information output from the FIFO management unit 61 and instructing the selector 52 to do packet selection including discard, and a function of outputting the address information of a packet selected by the selector 52 and a write instruction to the write control unit 63.

The write control unit 63 has a function of outputting the address information output from the read and selection control unit 62 to the address control unit 65, and a function of outputting the write instruction output from the read and selection control unit 62 to the packet buffer BUF.

The read control unit 64 has a function of outputting the address information of a packet to be read out of the packet buffer BUF to the address control unit 65, and a function of outputting the read instruction of the packet to the packet buffer BUF.

The address control unit 65 has a function of outputting address information output from the write control unit 63 to the packet buffer BUF as the write address of a packet to be written in the packet buffer BUF, and a function of outputting address information output from the read control unit 64 to the packet buffer BUF as the read address of a packet to be read out of the packet buffer BUF.

Hence, in the conventional packet transfer processing apparatus 50 shown in FIG. 8, when writing a packet received from the first network NW1 in the packet buffer BUF, based on the amount of packets in each register file 51 managed by the FIFO management unit 61, the read and selection control unit 62 selects a packet to be written. Based on a write instruction and address information representing the storage location of the packet, which are output from the read and selection control unit 62, the write control unit 63 and the address control unit 65 execute access control of the packet buffer BUF, thereby writing the packet.

When reading out a packet from the packet buffer BUF and transmitting it to the second network NW2, based on a read instruction and address information representing the storage location of a packet to be read out, which are output from the read control unit 64, the read control unit 64 and the address control unit 65 execute access control of the packet buffer BUF, thereby reading out the packet.

RELATED ART LITERATURE

Patent Literature

Patent Literature 1: Japanese Patent Laid-Open No. 2004-178056

DISCLOSURE OF INVENTION

Problem to be Solved by the Invention

However, in this conventional technique, normally, lines from the first network NW1 formed from an access network or the like are multiplexed to increase the aggregation efficiency in packet transfer processing performance, and assignment is excessive relative to the packet transfer processing performance. For this reason, if reception packets exceeding the write bandwidth as the limit of write processing have simultaneously arrived from these lines, write processing to the packet buffer BUF delays, and discard of reception packets occurs.

At this time, the reception packets are discarded while making full use of the write bandwidth to the packet buffer BUF. Hence, the reception packets from the lines are discarded in linkage, resulting in degradation in packet transfer performance.

The present invention has been made to solve the problem, and has as its object to provide a buffer control technique capable of suppressing occurrence of linked discard of reception packets caused by a shortage of the write bandwidth.

Means of Solution to the Problem

In order to achieve the above-described object, according to the present invention, there is provided a packet transfer processing apparatus that concentrates a plurality of lines from a first network and connects the lines to a second network, comprising register files provided on a line basis and configured to hold packets received from the respective lines, a selector configured to sequentially selectively output one of the packets read out of the register files, a data write unit configured to write the packet selectively output from the selector in a packet buffer, a data read unit configured to transmit a packet read out of the packet buffer to the second network, a write preference determination unit configured to compare a reception rate of packets received from the lines with a reception rate threshold for write preference determination, and in a case where the reception rate exceeds the reception rate threshold, determine that preference of a write operation is necessary, and a write preference control unit configured to increase, out of a total access bandwidth of the packet buffer, a write bandwidth for a packet write operation to the packet buffer as compared to a read bandwidth for a packet read operation from the packet buffer in a case where the write preference determination unit determines that the preference is necessary, thereby preferentially executing the packet write operation to the packet buffer.

According to the present invention, there is also provided a packet transfer processing apparatus that concentrates a plurality of lines from a first network and connects the lines to a second network, comprising register files equipped for each of the lines and configured to hold packets received from the respective lines, a selector configured to sequentially selectively output one of the packets read out of the register files, a data write unit configured to write the packet selectively output from the selector in a packet buffer, a data read unit configured to transmit a packet read out of the packet buffer to the second network, a buffer accumulation amount detection unit configured to detect a buffer accumulation amount in the packet buffer based on the number of packets written into the packet buffer and the number of packets read out of the packet buffer, and a read and selection control unit configured to compare the buffer accumulation amount detected by the buffer accumulation amount detection unit with a packet holding amount in the register file and determine whether or not some or all surplus packets exceeding a write bandwidth for a packet write operation to the packet buffer out of the packets held in the register file can be accumulated in the packet buffer, if the surplus packets can be accumulated, read the surplus packets out of the register file and selectively output the surplus packets from the selector to the data write unit, and if the surplus packets cannot be accumulated, read the surplus packets out of the register file and discard the surplus packets by the selector.

According to the present invention, there is also provided a packet transfer processing apparatus that concentrates a plurality of lines from a first network and connects the lines to a second network, comprising register files equipped for each of the lines and configured to hold packets received from the respective lines, a selector configured to sequentially selectively output one of the packets read out of the register files, a data write unit configured to write the packet selectively output from the selector in a packet buffer, a data read unit configured to transmit a packet read out of the packet buffer to the second network, a buffer accumulation amount detection unit configured to detect a buffer accumulation amount in the packet buffer based on the number of packets written into the packet buffer and the number of packets read out of the packet buffer, a write control unit configured to increase or decrease a write bandwidth for a packet write operation to the packet buffer in accordance with an increase/decrease in the buffer accumulation amount detected by the buffer accumulation amount detection unit, and a read control unit configured to increase or decrease a read bandwidth for a packet read operation from the packet buffer in accordance with an increase/decrease in the buffer accumulation amount detected by the buffer accumulation amount detection unit.

According to the present invention, there is provided a packet transfer processing method used in a packet transfer processing apparatus that concentrates a plurality of lines from a first network and connects the lines to a second network, comprising the step of causing register files to hold packets received from the respective lines, the step of causing a selector to sequentially selectively output one of the packets read out of the register files, the data write step of causing a data write unit to write the packet selectively output from the selector in a packet buffer, the data read step of causing a data read unit to transmit a packet read out of the packet buffer to the second network, the write preference determination step of causing a write preference determination unit to compare a reception rate of packets received from the lines with a reception rate threshold for write preference determination, and in a case where the reception rate exceeds the reception rate threshold, determine that preference of a write operation is necessary, and the write preference control step of causing a write preference control unit to increase, out of a total access bandwidth of the packet buffer, a write bandwidth for a packet write operation to the packet buffer as compared to a read bandwidth for a packet read operation from the packet buffer in a case where it is determined in the write preference determination step that the preference is necessary, thereby preferentially executing the packet write operation to the packet buffer.

According to the present invention, there is also provided a packet transfer processing method used in a packet transfer processing apparatus that concentrates a plurality of lines from a first network and connects the lines to a second network, comprising the step of causing register files to hold packets received from the respective lines, the step of causing a selector to sequentially selectively output one of the packets read out of the register files, the data write step of causing a data write unit to write the packet selectively output from the selector in a packet buffer, the data read step of causing a data read unit to transmit a packet read out of the packet buffer to the second network, the buffer accumulation amount detection step of causing a buffer accumulation amount detection unit to detect a buffer accumulation amount in the packet buffer based on the number of packets written into the packet buffer and the number of packets read out of the packet buffer, and the read and selection control step of causing a read and selection control unit to compare the buffer accumulation amount detected in the buffer accumulation amount detection step with a packet holding amount in the register file and determine whether or not some or all surplus packets exceeding a write bandwidth for a packet write operation to the packet buffer out of the packets held in the register file can be accumulated in the packet buffer, if the surplus packets can be accumulated, read the surplus packets out of the register file and selectively output the surplus packets from the selector to the data write unit, and if the surplus packets cannot be accumulated, read the surplus packets out of the register file and discard the surplus packets by the selector.

According to the present invention, there is also provided a packet transfer processing method used in a packet transfer processing apparatus that concentrates a plurality of lines from a first network and connects the lines to a second network, comprising the step of causing register files to hold packets received from the respective lines, the step of causing a selector to sequentially selectively output one of the packets read out of the register files, the data write step of causing a data write unit to write the packet selectively output from the selector in a packet buffer, the data read step of causing a data read unit to transmit a packet read out of the packet buffer to the second network, the buffer accumulation amount detection step of causing a buffer accumulation amount detection unit to detect a buffer accumulation amount in the packet buffer based on the number of packets written into the packet buffer and the number of packets read out of the packet buffer, the write control step of causing a write control unit to increase or decrease a write bandwidth for a packet write operation to the packet buffer in accordance with an increase/decrease in the buffer accumulation amount detected in the buffer accumulation amount detection step, and the read control step of causing a read control unit to increase or decrease a read bandwidth for a packet read operation from the packet buffer in accordance with an increase/decrease in the buffer accumulation amount detected in the buffer accumulation amount detection step.

Effect of the Invention

According to the present invention, even if the reception rate rises, the packet loss occurrence frequency can be reduced, and occurrence of linked discard of reception packets caused by a shortage of the write bandwidth can be suppressed. It is therefore possible to satisfactorily maintain packet transfer performance.

BEST MODE FOR CARRYING OUT THE INVENTION

The embodiments of the present invention will now be described with reference to the accompanying drawings.

First Embodiment

A packet transfer processing apparatus 10 according to the first embodiment of the present invention will be described first with reference to FIG. 1.

The packet transfer processing apparatus 10 is a packet transfer processing apparatus such as a router or a switch that concentrates a plurality of lines from a first network NW1 such as an access network and connects them to a second network NW2 such as a core network. The packet transfer processing apparatus 10 has a function of performing inbound processing of receiving a packet from the access network side where a user apparatus is connected, and a function of performing outbound processing of transmitting a packet to the access network side.

As described above, in inbound processing of the packet transfer processing apparatus 10, linked discard of reception packets occurs in a case of shortage of a write bandwidth in a packet buffer for temporarily accumulating reception packets. Hence, if a shortage of the write bandwidth has occurred, occurrence of linked discard of reception packets can be suppressed by extending the write bandwidth.

In this embodiment, focus is placed on the fact that the total access bandwidth of the packet buffer is formed from a write bandwidth assigned for packet write and a read bandwidth assigned for packet read. When a shortage of the write bandwidth has occurred, the assignment ratio of the write bandwidth out of the total access bandwidth is increased as compared to the read bandwidth. More specifically, the packet reception rate is always monitored. If the reception rate exceeds a threshold, the assignment ratio of the write bandwidth in the packet buffer is increased.

Figure 1:
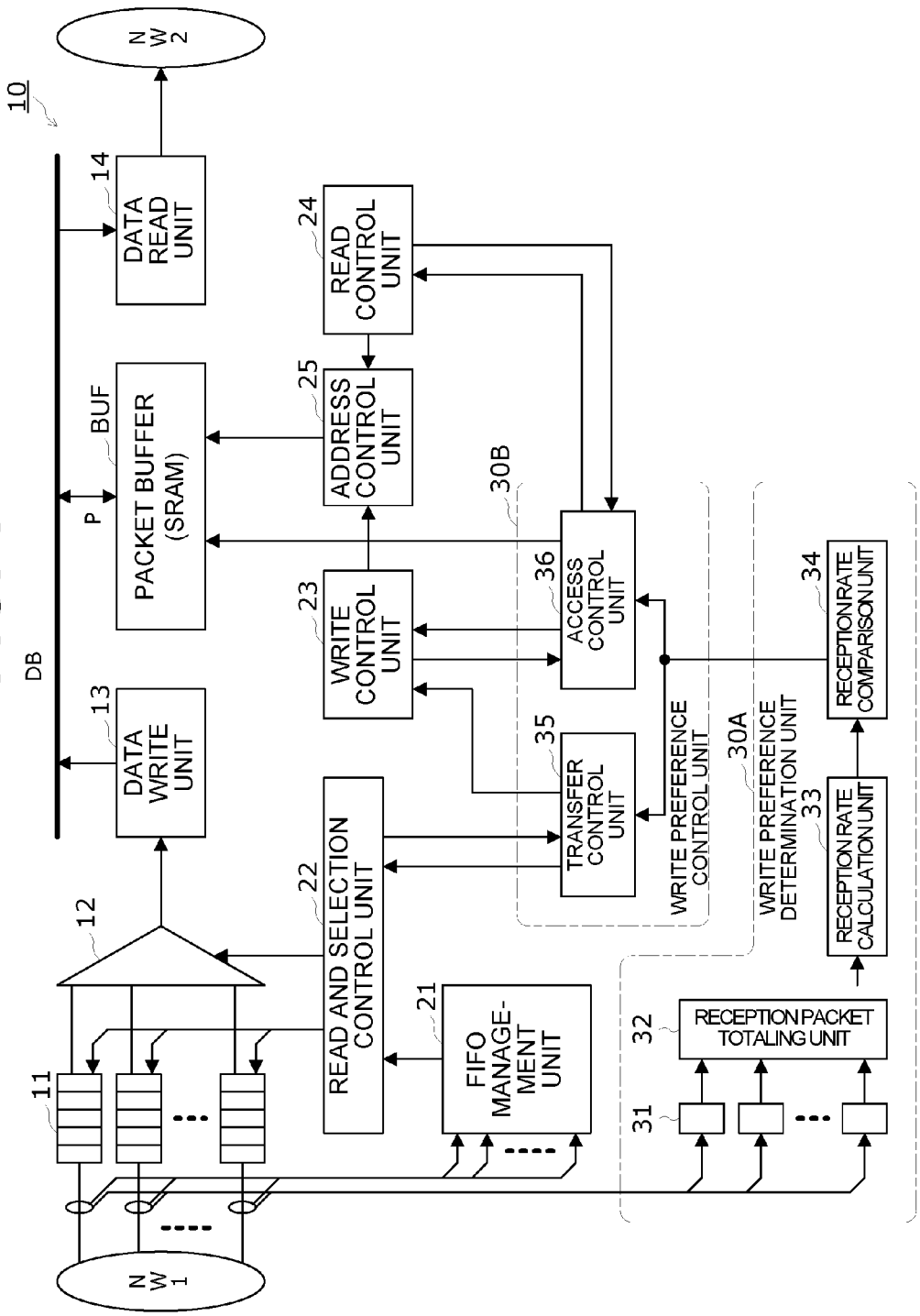
FIG. 1 is a block diagram showing the arrangement of main parts of a packet transfer processing apparatus according to the first embodiment.

As shown in FIG. 1, a packet transfer processing apparatus 10 includes a register file 11, a selector 12, a data write unit 13, a packet buffer BUF, and a data read unit 14 as main functional units used for inbound processing.

The register file 11 is provided for each line from the first network NW1 formed from an access network or the like, and has a function of receiving a packet from each line and holding it in the internal register of its own.

The selector 12 has a function of selecting a packet read out of the register file 11.

The data write unit 13 has a function of inputting a packet selected by the selector 12 to a port P of the packet buffer BUF via a data bus DB.

The packet buffer BUF is formed from a single port type SRAM including the port P shared for write and read, and has a function of writing a packet input from the data write unit 13 to the port P in a storage area designated by write address information out of the SRAM in accordance with a write instruction, and a function of reading out a packet from a storage area designated by read address information out of the SRAM and outputting the packet from the port P to the data read unit 14 in accordance with a read instruction.

The data read unit 14 has a function of reading out a packet accumulated in the packet buffer BUF from the port P via the data bus DB and transmitting it to the second network NW2.

As shown in FIG. 1, the packet transfer processing apparatus 10 also includes a FIFO management unit 21, a read and selection control unit 22, a write control unit 23, a read control unit 24, and an address control unit 25 as main functional units used for access control of the packet buffer BUF in the inbound processing.

The FIFO management unit 21 has a function of managing the amount of packets and address information written in each register file 11.

The read and selection control unit 22 has a function of instructing the register file 11 to read out a packet stored in the register file 11 in accordance with the amount of packets and address information output from the FIFO management unit 21 and instructing the selector 12 to do packet selection including discard, and a function of outputting the address information of a packet selected by the selector 12 and a write instruction to a write preference control unit 30B (to be described later).

The write control unit 23 has a function of outputting address information from the write preference control unit 30B to the address control unit 25, and a function of outputting an input write instruction to the packet buffer BUF.

The read control unit 24 has a function of outputting the address information of a packet to be read out of the packet buffer BUF to the address control unit 25, and a function of outputting the read instruction of the packet to the packet buffer BUF.

The address control unit 25 has a function of outputting address information output from the write control unit 23 to the packet buffer BUF as the write address of a packet to be written in the packet buffer BUF, and a function of outputting address information output from the read control unit 24 to the packet buffer BUF as the read address of a packet to be read out of the packet buffer BUF.

In this embodiment, a write preference determination unit 30A and the write preference control unit 30B are provided as components to be used for inbound processing.

The write preference determination unit 30A has a function of comparing the reception rate of packets received from each line of the first network NW1 with a reception rate threshold for write preference determination, and a function of, in a case where the reception rate exceeds the reception rate threshold, determining that preference of a write operation is necessary.

The write preference control unit 30B has a function of increasing, out of the total access bandwidth of the packet buffer BUF, the write bandwidth for a packet write operation to the packet buffer BUF as compared to the read bandwidth for a packet read operation from the packet buffer BUF in a case where the write preference determination unit 30A determines that the preference is necessary, thereby preferentially executing the packet write operation to the packet buffer BUF.

The write preference determination unit 30A includes a reception packet count unit 31, a reception packet totaling unit 32, a reception rate calculation unit 33, and a reception rate comparison unit 34 as main functional units.

The write preference control unit 30B includes a transfer control unit 35 and an access control unit 36 as main functional units.

The reception packet count unit 31 is provided for each line from the first network NW1, and has a function of counting reception packets captured from the line.

The reception packet totaling unit 32 has a function of totaling count results obtained by the reception packet count units 31.

The reception rate calculation unit 33 has a function of calculating the reception rate of reception packets of all lines based on the totaling result obtained by the reception packet totaling unit 32.

The reception rate comparison unit 34 has a function of comparing the reception rate obtained by the reception rate calculation unit 33 with a preset reception rate threshold for write preference determination and determining the necessity of a write preference operation in the packet buffer BUF based on the comparison result. If the reception rate exceeds the reception rate threshold, preference necessity representing that preference of the write operation to the read operation is necessary is output as a write preference determination result. If the reception rate is equal to or less than the reception rate threshold, preference unnecessity representing that preference of the write operation is unnecessary is output.

The transfer control unit 35 has a function of, when writing a packet in the packet buffer BUF, outputting a read permission signal for permitting packet read from the register file 11 to the read and selection control unit 22, a function of changing the output interval of the read permission signal in accordance with the write preference determination result from the reception rate comparison unit 34, and a function of outputting address information and a write instruction from the read and selection control unit 22 to the write control unit 23.

In this embodiment, the assignment ratios of the write bandwidth and the read bandwidth to the packet buffer BUF are changed, thereby performing write preference control in the packet buffer BUF. For example, if the write preference determination result indicates preference necessity, the write bandwidth out of the total access bandwidth of the packet buffer BUF is set to 100%, and the read bandwidth is set to 0%. If the write preference determination result indicates preference unnecessity, the write bandwidth out of the total access bandwidth of the packet buffer BUF is set to 50%, and the read bandwidth is set to 50%. In a case of preference necessity, the transfer control unit 35 outputs the read permission signal at an interval ½ that in a case of preference unnecessity.

The access control unit 36 has a function of outputting a write permission for permitting packet write in the packet buffer BUF to the write control unit 23, a function of outputting a packet write instruction to the packet buffer BUF in response to a write request from the write control unit 23, a function of outputting a read permission for permitting packet read from the packet buffer BUF to the read control unit 24, a function of outputting a packet read instruction to the packet buffer BUF in response to a read request from the read control unit 24, and a function of changing the ratio of outputting the write permission and the read permission in accordance with the write preference determination result from the reception rate comparison unit 34.

According to the above-described example, the access control unit 36 outputs only the write permission and stops output of the read permission in a case where the write preference determination result indicates preference necessity, and sets the output of the write permission and the output of the read permission to the same ratio in a case where the write preference determination result indicates preference unnecessity.

[Operation of First Embodiment]

The operation of the packet transfer processing apparatus 10 according to this embodiment will be described next with reference to FIGS. 1 and 2.

In this example, the total access bandwidth of the packet buffer BUF is set to 200 Gbps. If the write preference determination result indicates preference necessity, a write bandwidth WW out of the total access bandwidth of the packet buffer BUF is set to 100% (=200 Gbps), and a read bandwidth RW is set to 0%. If the write preference determination result indicates preference unnecessity, the write bandwidth WW out of the total access bandwidth of the packet buffer BUF is set to 50% (=100 Gbps), and the read bandwidth RW is set to 50% (=100 Gbps). A reception rate threshold RRth is set to 80 Gbps.

Note that the write bandwidth WW and the read bandwidth RW in a case where the write preference determination result indicates preference necessity are not limited to 100% and 0%, and can appropriately be decided to, for example, 80% and 20% in accordance with the lines, access network, and core network as the processing target of the packet transfer processing apparatus 10 and also operation conditions and specifications. The reception rate threshold RRth can also appropriately be decided to, for example, 60 Gbps in accordance with the lines, access network, and core network as the processing target of the packet transfer processing apparatus 10 and also operation conditions and specifications.

The numbers of packets that have arrived from the lines of the first network NW1 are periodically counted by the reception packet count units 31 on a line basis and totaled by the reception packet totaling unit 32. The reception rate calculation unit 33 calculates a reception rate RR of the reception packets of all lines based on the totaling result. The reception rate comparison unit 34 compares the reception rate RR with the preset reception rate threshold RRth and determines the necessity of the write preference operation in the packet buffer BUF.

Figure 2:
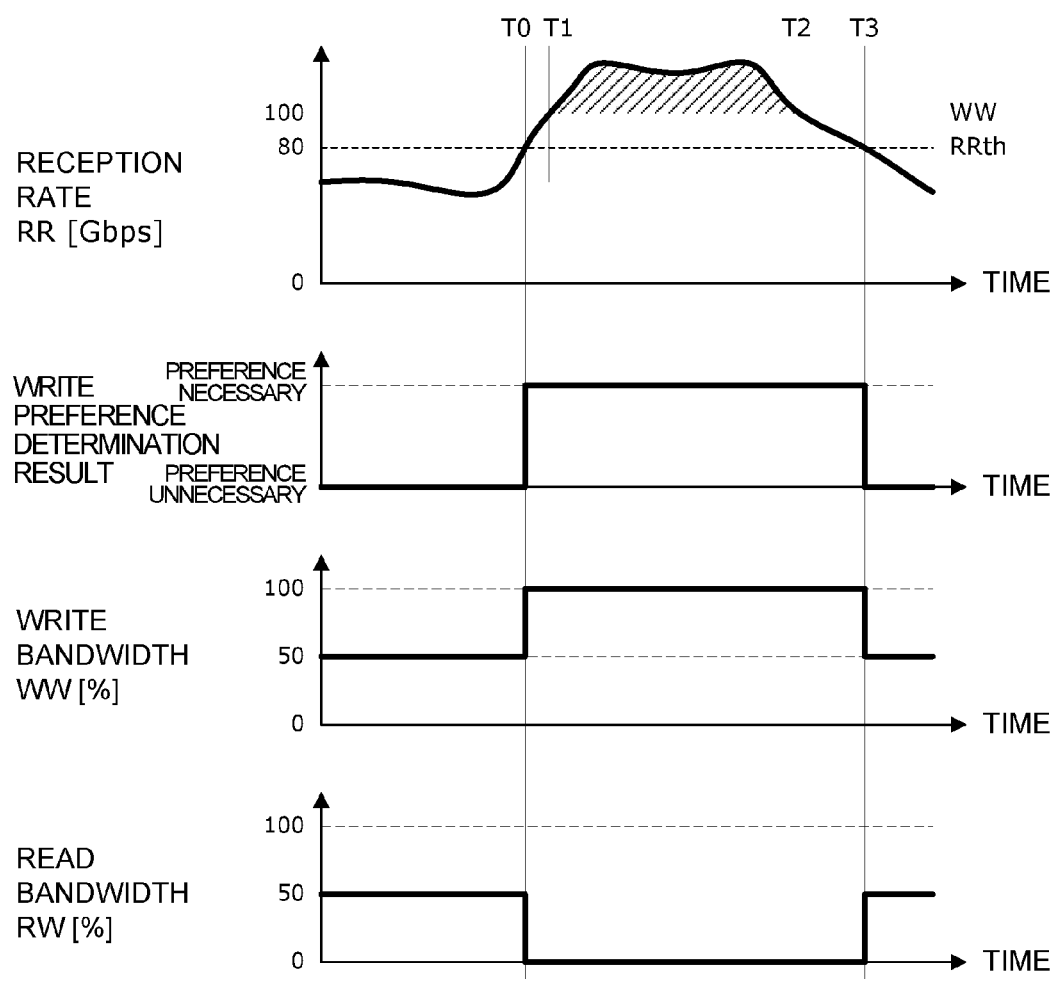
FIG. 2 is a timing chart showing write preference control of the packet transfer processing apparatus according to the first embodiment.

Before time T0 in FIG. 2, since the reception rate RR is equal to or less than the reception rate threshold RRth, the write preference determination result indicates preference unnecessity. For this reason, 50% (=100 Gbps) is assigned to the packet buffer BUF as the write bandwidth WW out of the total access bandwidth, and 50% (=100 Gbps) is assigned as the read bandwidth RW.

Hence, the transfer control unit 35 outputs the read permission signal to the read and selection control unit 22 at an interval corresponding to the write bandwidth of 100 Gbps. A packet is read out of the register file 11 at a corresponding timing, and output to the data write unit 13 via the selector 12.

Additionally, address information and a write instruction output from the read and selection control unit 22 in synchronism with the packet read are notified to the write control unit 23 via the transfer control unit 35.

On the other hand, the access control unit 36 notifies the write control unit 23 of a write permission at an interval corresponding to the write bandwidth of 100 Gbps, and notifies the read control unit 24 of a read permission at an interval corresponding to the read bandwidth of 100 Gbps.

According to the write permission from the access control unit 36, the write control unit 23 thus notifies the address control unit 25 of the address information from the transfer control unit 35, and notifies the access control unit 36 of a write request.

Hence, in accordance with the write instruction from the access control unit 36, the packet output from the data write unit 13 to the port P of the packet buffer BUF is written in a storage area corresponding to the address information from the address control unit 25.

After that, at the time T0, when the reception rate RR exceeds the reception rate threshold RRth, the write preference determination result is switched to preference necessity. For this reason, 100% (=200 Gbps) is assigned to the packet buffer BUF as the write bandwidth WW out of the total access bandwidth, and 0% is assigned as the read bandwidth RW.

Hence, the transfer control unit 35 outputs the read permission signal to the read and selection control unit 22 at an interval corresponding to the write bandwidth of 200 Gbps.

On the other hand, the access control unit 36 notifies the write control unit 23 of a write permission at an interval corresponding to the write bandwidth of 200 Gbps, and stops notification of a read permission to the read control unit 24.

Accordingly, in the packet buffer BUF, the read operation is not performed, and only the write operation is preferentially performed.

For this reason, the packets accumulated in the register file 11 are read out at a higher speed and written in the packet buffer BUF, and the buffer accumulation amount in the register file 11 decreases. Hence, since the buffer accumulation amount in the register file 11 decreases, and the write bandwidth increases after the time T0, occurrence of linked discard of reception packets caused by a shortage of the write bandwidth can be suppressed even if the reception rate RR exceeds 100 Gbps over times T1 to T2 after that. Note that if the write bandwidth WW is not increased, packets corresponding to the hatched portion in FIG. 2 exceeding the write bandwidth WW are discarded, leading to linked discard.

After that, when the reception rate RR becomes equal to or less than the reception rate threshold RRth at time T3, the write preference determination result is switched to preference unnecessity. For this reason, 50% (=100 Gbps) is assigned to the packet buffer BUF as the write bandwidth WW out of the total access bandwidth, and 50% (=100 Gbps) is assigned as the read bandwidth RW as before the time T0.

Accordingly, the packets accumulated in the packet buffer BUF are sequentially read out.

[Effects of First Embodiment]

As described above, according to this embodiment, the write preference determination unit 30A compares the reception rate of packets received from each line of the first network NW1 with the reception rate threshold for write preference determination, and in a case where the reception rate exceeds the reception rate threshold, determines that preference of a write operation is necessary. In a case where the write preference determination unit 30A determines that the preference is necessary, the write preference control unit 30B increases, out of the total access bandwidth of the packet buffer BUF, the write bandwidth for a packet write operation to the packet buffer BUF as compared to the read bandwidth for a packet read operation from the packet buffer BUF, thereby preferentially executing the packet write operation to the packet buffer BUF.

Accordingly, if the reception rate exceeds the reception rate threshold, the write bandwidth increases as compared to the read bandwidth, and the packet write operation to the packet buffer BUF is preferentially executed.

For this reason, the packets accumulated in the register file 11 are read out at a higher speed and written in the packet buffer BUF, and the buffer accumulation amount in the register file 11 decreases. Hence, since the buffer accumulation amount in the register file 11 gradually decreases, and the write bandwidth increases, the packet loss occurrence frequency can be reduced, and occurrence of linked discard of reception packets caused by a shortage of the write bandwidth can be suppressed even if the reception rate increases after that.

In this embodiment, in a case where the write preference determination unit 30A determines that the preference is necessary, the write preference control unit 30B may stop the read operation and execute only the write operation. This can very quickly decrease the buffer accumulation amount in the register file 11 and maximize the write bandwidth. Even if the reception rate greatly increases after that, occurrence of linked discard of reception packets caused by a shortage of the write bandwidth can be suppressed.

In this embodiment, a predetermined effect can be attained even if the reception rate threshold RRth has the same value as the write bandwidth WW. However, when the reception rate threshold RRth is set to a value smaller than the write bandwidth WW, packets in the register file 11 can be written in the packet buffer BUF in advance before the reception rate RR reaches the write bandwidth WW. This can more effectively suppress occurrence of linked discard of reception packets caused by a shortage of the write bandwidth.

Second Embodiment

A packet transfer processing apparatus 10 according to the second embodiment of the present invention will be described next with reference to FIG. 3.

In the first embodiment, a case where the packet write operation to the packet buffer BUF is preferentially executed in accordance with determination based on the reception rate of packets so as to suppress occurrence of linked discard of reception packets has been described as an example. In this embodiment, a case where a packet discard operation in a register file 11 is preferentially executed in accordance with determination based on a buffer accumulation amount in a packet buffer BUF so as to suppress occurrence of linked discard of reception packets will be described.

Figure 3:
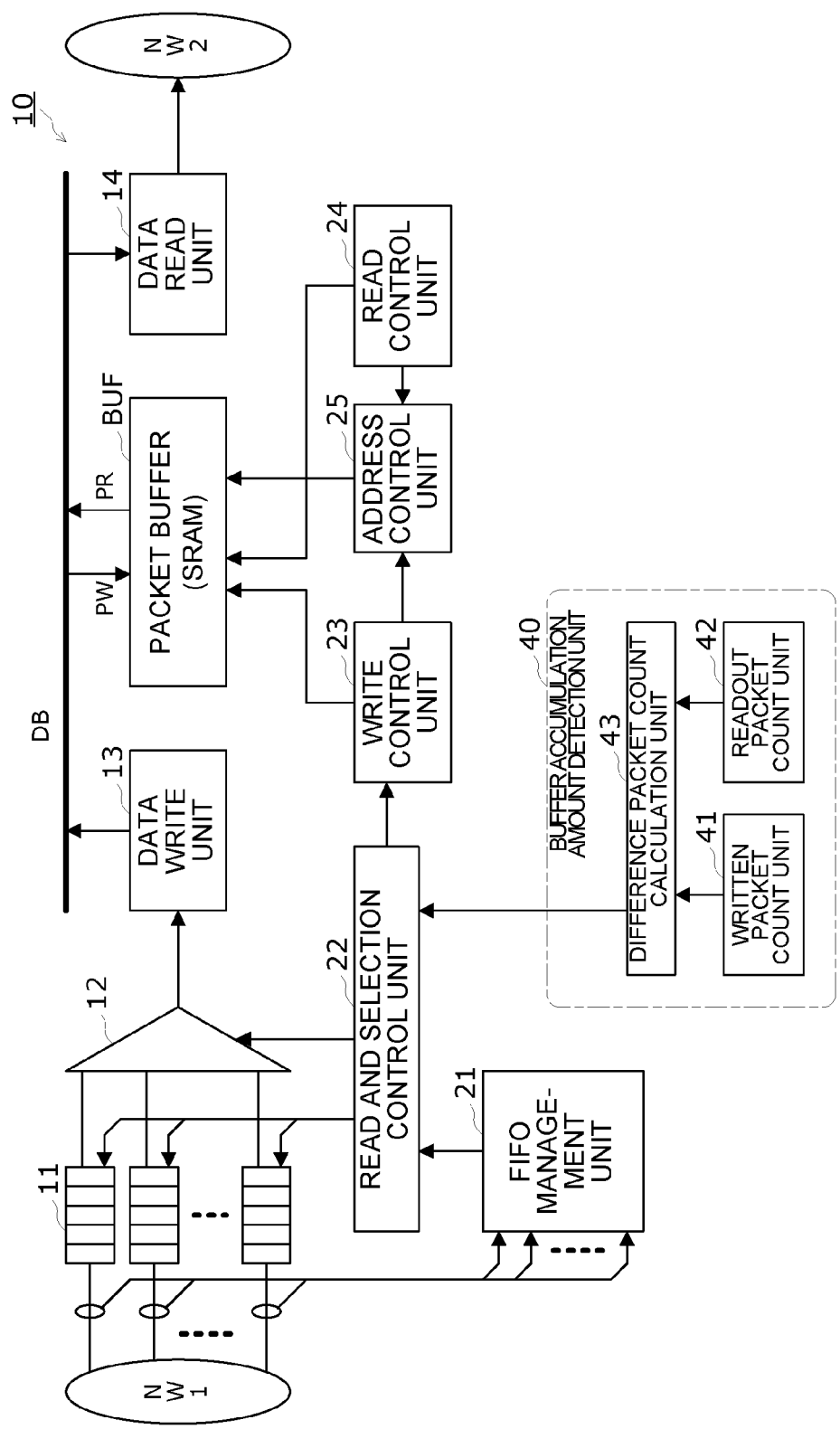
FIG. 3 is a block diagram showing the arrangement of main parts of a packet transfer processing apparatus according to the second embodiment.

As shown in FIG. 3, in the packet transfer processing apparatus 10 according to this embodiment, a buffer accumulation amount detection unit 40 has a function of detecting a buffer accumulation amount in the packet buffer BUF based on the number of packets written into the packet buffer BUF and the number of packets read out of the packet buffer BUF.

The buffer accumulation amount detection unit 40 includes a written packet count unit 41, a readout packet count unit 42, and a difference packet count calculation unit 43 as main functional units.

The written packet count unit 41 has a function of counting the number of packets written in the packet buffer BUF based on a processing signal from a data write unit 13 or a write control unit 23.

The readout packet count unit 42 has a function of counting the number of packets read out of the packet buffer BUF based on a processing signal from a data read unit 14 or a read control unit 24.

The difference packet count calculation unit 43 has a function of calculating the difference between the number of written packets counted by the written packet count unit 41 and the number of readout packets counted by the readout packet count unit 42, thereby detecting the buffer accumulation amount in the packet buffer BUF.

A read and selection control unit 22 has a function of comparing the buffer accumulation amount detected by the buffer accumulation amount detection unit 40 with a packet holding amount in the register file 11 so as to determine whether or not some or all surplus packets exceeding the write bandwidth out of the packets held in the register file 11 can be accumulated in the packet buffer BUF, a function of, if the surplus packets can be accumulated, reading out the surplus packets from the register file 11 and selectively outputting them from a selector 12 to the data write unit 13, and a function of, if the surplus packets cannot be accumulated, reading out the surplus packets from the register file 11 and discarding them by the selector 12.

The packet buffer BUF is formed from a dual port type SRAM separately including a write port PW and a read port PR.

The data write unit 13 has a function of inputting a packet selected by the selector 12 to the write port PW of the packet buffer BUF via a data bus DB.

The data read unit 14 has a function of reading out a packet accumulated in the packet buffer BUF from the port P via the data bus DB and transmitting it to a second network NW2.

Note that the remaining functional units according to this embodiment are the same as in the above-described first embodiment, and a detailed description thereof will be omitted here.

[Operation of Second Embodiment]

The operation of the packet transfer processing apparatus 10 according to this embodiment will be described next with reference to FIG. 3.

The buffer accumulation amount detection unit 40 periodically detects the buffer accumulation amount in the packet buffer BUF based on the number of packets written into the packet buffer BUF and the number of packets read out of the packet buffer BUF.

Every time the buffer accumulation amount detection unit 40 detects the buffer accumulation amount, the read and selection control unit 22 compares the buffer accumulation amount with the packet holding amount in the register file 11, and determines whether some or all surplus packets exceeding the write bandwidth out of the packets held in the register file 11 can be accumulated in the packet buffer BUF.

If the packet buffer BUF has a free storage area, and the surplus packets can be accumulated, the surplus packets are read out of the register file 11 and selectively output from the selector 12 to the data write unit 13.

On the other hand, if the packet buffer BUF has no free storage area, and the surplus packets cannot be accumulated, the surplus packets are read out of the register file 11 and discarded by the selector 12.

[Effects of Second Embodiment]

As described above, according to this embodiment, the buffer accumulation amount detection unit 40 detects the buffer accumulation amount in the packet buffer BUF based on the number of packets written into the packet buffer BUF and the number of packets read out of the packet buffer BUF. The read and selection control unit 22 compares the buffer accumulation amount detected by the buffer accumulation amount detection unit 40 with the packet holding amount in the register file 11, thereby determining whether some or all surplus packets exceeding the write bandwidth out of the packets held in the register file 11 can be accumulated in the packet buffer BUF. If the surplus packets can be accumulated, the read and selection control unit 22 reads out the surplus packets from the register file 11 and selectively outputs them from the selector 12 to the data write unit 13. If the surplus packets cannot be accumulated, the read and selection control unit 22 reads out the surplus packets from the register file 11 and discards them by the selector 12.

Accordingly, if the packet buffer BUF has a free storage area, the surplus packets in the register file 11 are written in the packet buffer BUF. If the packet buffer BUF has no free storage area, the surplus packets in the register file 11 are discarded by the selector 12.

Hence, since the buffer accumulation amount in the register file 11 gradually decreases, the packet loss occurrence frequency can be reduced, and occurrence of linked discard of reception packets caused by a shortage of the write bandwidth can be suppressed even if the reception rate increases after that.

Third Embodiment

A packet transfer processing apparatus 10 according to the third embodiment of the present invention will be described next with reference to FIG. 4.

In the second embodiment, a case where the packet discard operation in the register file 11 is preferentially executed in accordance with determination based on the buffer accumulation amount in the packet buffer BUF so as to suppress occurrence of linked discard of reception packets has been described as an example. In this embodiment, a case where a packet write operation in a packet buffer BUF is preferentially executed in accordance with determination based on a buffer accumulation amount in the packet buffer BUF so as to suppress occurrence of linked discard of reception packets will be described.

Figure 4:
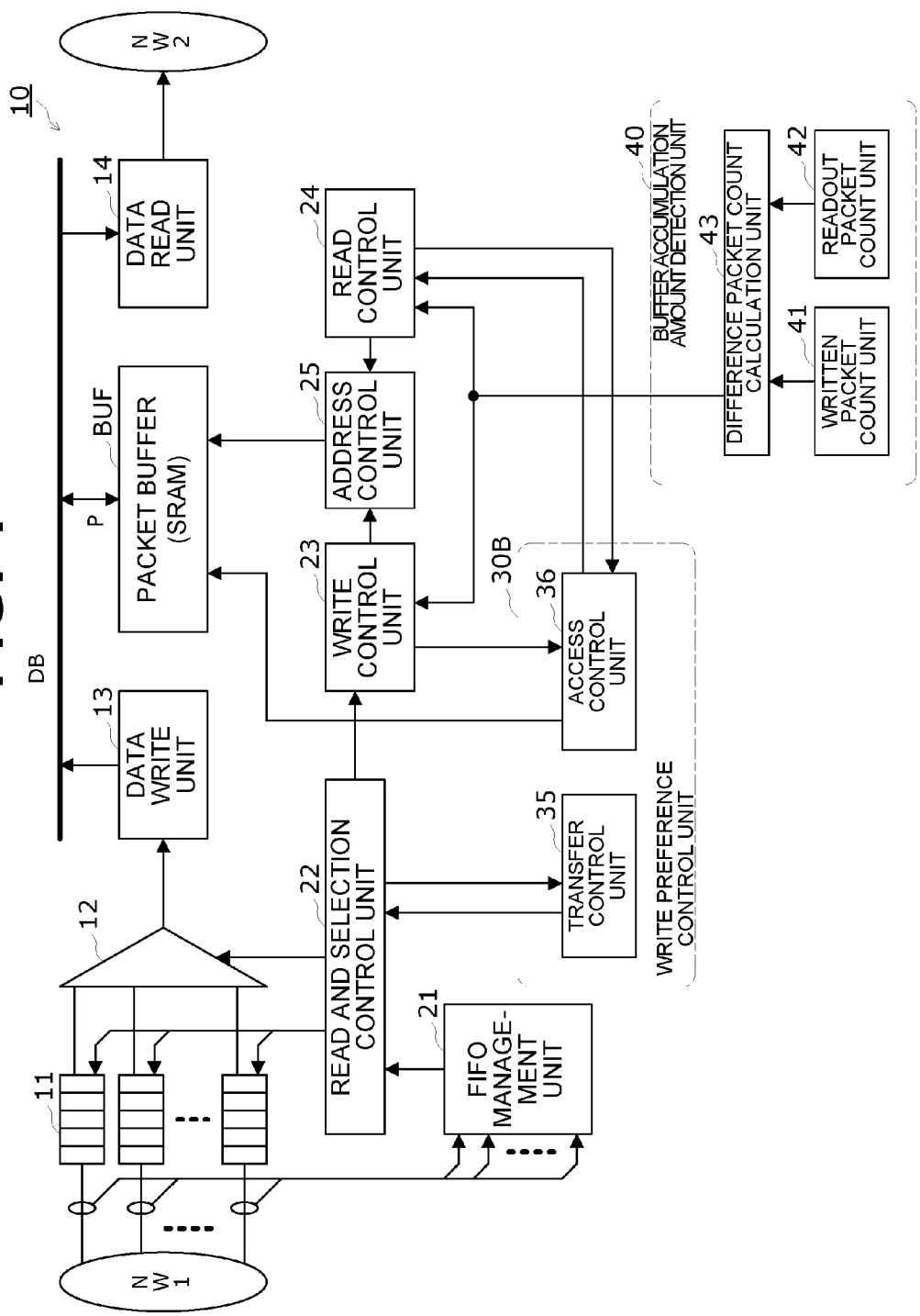
FIG. 4 is a block diagram showing the arrangement of main parts of a packet transfer processing apparatus according to the third embodiment.

As shown in FIG. 4, in the packet transfer processing apparatus 10 according to this embodiment, a buffer accumulation amount detection unit 40 has a function of detecting a buffer accumulation amount in the packet buffer BUF based on the number of packets written into the packet buffer BUF and the number of packets read out of the packet buffer BUF. Note that the arrangement of the buffer accumulation amount detection unit 40 is the same as in the second embodiment, and a description thereof will be omitted here.

A write control unit 23 has a function of increasing/decreasing the write bandwidth in accordance with an increase/decrease in the buffer accumulation amount detected by the buffer accumulation amount detection unit 40.

A read control unit 24 has a function of increasing/decreasing the read bandwidth in accordance with an increase/decrease in the buffer accumulation amount detected by the buffer accumulation amount detection unit 40.

The packet buffer BUF is formed from a single port type SRAM including a port P shared for write and read, and has a function of writing a packet input from a data write unit 13 to the port P in a storage area designated by write address information out of the SRAM in accordance with a write instruction, and a function of reading out a packet from a storage area designated by read address information out of the SRAM and outputting the packet from the port P to a data read unit 14 in accordance with a read instruction.

The data read unit 14 has a function of reading out a packet accumulated in the packet buffer BUF from the port P via a data bus DB and transmitting it to a second network NW2.

Note that the remaining functional units according to this embodiment are the same as in the above-described first embodiment, and a detailed description thereof will be omitted here.

[Operation of Third Embodiment]

The operation of the packet transfer processing apparatus 10 according to this embodiment will be described next with reference to FIGS. 4 and 5.

In this example, a buffer accumulation amount threshold PCNTth for write preference determination is provided for a buffer accumulation amount PCNT in the packet buffer BUF. If the buffer accumulation amount PCNT exceeds the buffer accumulation amount threshold PCNTth, a write bandwidth WW out of the total access bandwidth of the packet buffer BUF is set to 100%, and a read bandwidth RW is set to 0%. If the buffer accumulation amount PCNT does not exceed the buffer accumulation amount threshold PCNTth, the write bandwidth out of the total access bandwidth of the packet buffer BUF is set to 50%, and the read bandwidth is set to 50%.

Note that the write bandwidth WW and the read bandwidth RW in a case where the buffer accumulation amount PCNT exceeds the buffer accumulation amount threshold PCNTth are not limited to 100% and 0%, and can appropriately be decided to, for example, 80% and 20% in accordance with the lines, access network, and core network as the processing target of the packet transfer processing apparatus 10 and also operation conditions and specifications. The buffer accumulation amount threshold PCNTth can also appropriately be decided to, for example, 60 Gbps in accordance with the lines, access network, and core network as the processing target of the packet transfer processing apparatus 10 and also operation conditions and specifications.

The buffer accumulation amount detection unit 40 periodically detects the buffer accumulation amount PCNT in the packet buffer BUF based on the number of packets written into the packet buffer BUF and the number of packets read out of the packet buffer BUF.

Every time the buffer accumulation amount detection unit 40 detects the buffer accumulation amount PCNT, the write control unit 23 compares the buffer accumulation amount PCNT with the preset buffer accumulation amount threshold PCNTth.

Every time the buffer accumulation amount detection unit 40 detects the buffer accumulation amount PCNT, the read control unit 24 compares the buffer accumulation amount PCNT with the preset buffer accumulation amount threshold PCNTth.

Figure 5:
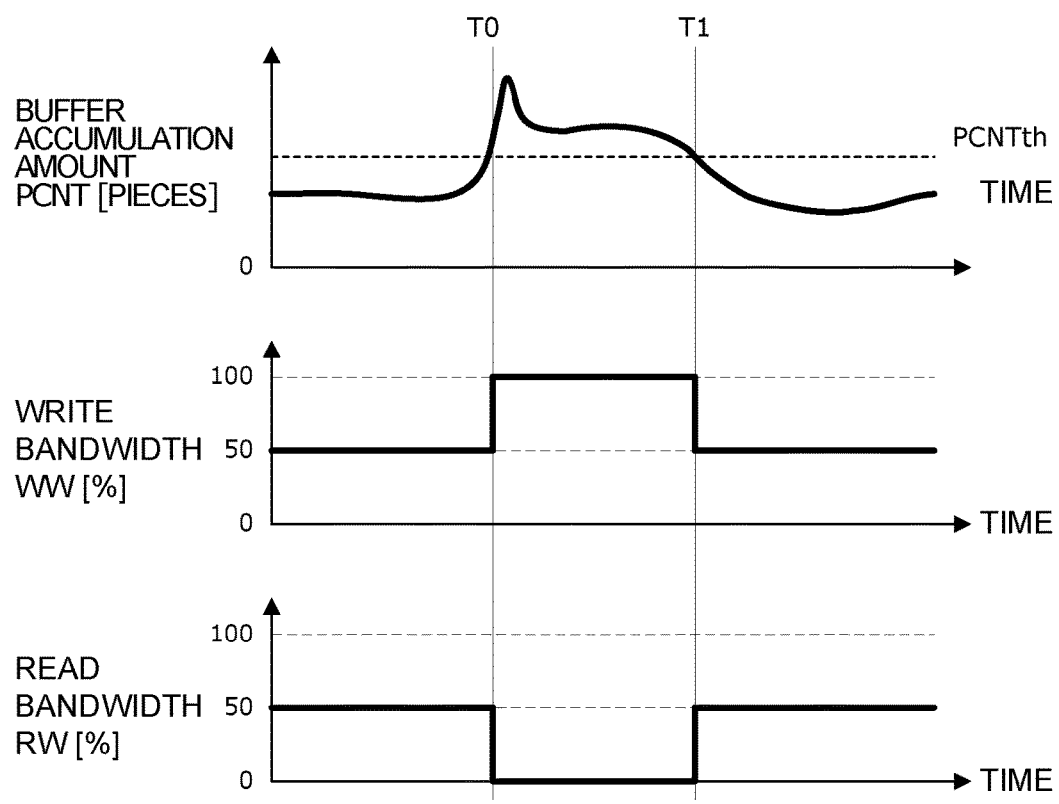
FIG. 5 is a timing chart showing discard preference control of the packet transfer processing apparatus according to the third embodiment.

Before time T0 in FIG. 5, since the buffer accumulation amount PCNT is equal to or less than the buffer accumulation amount threshold PCNTth, the write control unit 23 sets the write bandwidth WW out of the total access bandwidth of the packet buffer BUF to 50%, and similarly, the read control unit 24 sets the read bandwidth RW out of the total access bandwidth of the packet buffer BUF to 50%.

After that, at the time T0, when the buffer accumulation amount PCNT exceeds the buffer accumulation amount threshold PCNTth, the write control unit 23 sets the write bandwidth WW out of the total access bandwidth of the packet buffer BUF to 100%, and similarly, the read control unit 24 sets the read bandwidth RW out of the total access bandwidth of the packet buffer BUF to 0%.

Hence, the write control unit 23 outputs the read permission signal to a read and selection control unit 22 at an interval corresponding to the write bandwidth of 100%. A packet is read out of a register file 11 at a corresponding timing, and output to the data write unit 13 via a selector 12.

Additionally, the read control unit 24 stops the read operation because the read bandwidth RW is 0%.

Accordingly, in the packet buffer BUF, the read operation is not performed, and only the write operation is preferentially performed.

For this reason, the packets accumulated in the register file 11 are read out at a higher speed and written in the packet buffer BUF, and the buffer accumulation amount in the register file 11 decreases. Hence, since the buffer accumulation amount in the register file 11 decreases, and the write bandwidth increases after the time T0, occurrence of linked discard of reception packets caused by a shortage of the write bandwidth can be suppressed even if a reception rate RR increases.

After that, when the buffer accumulation amount PCNT becomes equal to or less than the buffer accumulation amount threshold PCNTth at time T1, the write control unit 23 and the read control unit 24 set the write bandwidth WW to 50% and the read bandwidth RW to 50% as before the time T0.

Accordingly, the packets accumulated in the packet buffer BUF are sequentially read out.

[Effects of Third Embodiment]

As described above, according to this embodiment, the buffer accumulation amount detection unit 40 detects the buffer accumulation amount in the packet buffer BUF based on the number of packets written into the packet buffer and the number of packets read out of the packet buffer BUF. The write control unit 23 increases/decreases the write bandwidth in accordance with an increase/decrease in the buffer accumulation amount detected by the buffer accumulation amount detection unit 40. The read control unit 24 increases/decreases the read bandwidth in accordance with an increase/decrease in the buffer accumulation amount detected by the buffer accumulation amount detection unit 40.

Accordingly, if the packet buffer BUF has a free storage area, the write bandwidth increases as compared to the read bandwidth, and the packet write operation to the packet buffer BUF is preferentially executed.

For this reason, the packets accumulated in the register file 11 are read out at a higher speed and written in the packet buffer BUF, and the buffer accumulation amount in the register file 11 decreases. Hence, since the buffer accumulation amount in the register file 11 gradually decreases, and the write bandwidth increases, the packet loss occurrence frequency can be reduced, and occurrence of linked discard of reception packets caused by a shortage of the write bandwidth can be suppressed even if the reception rate increases after that.

Fourth Embodiment

A packet transfer processing apparatus 10 according to the fourth embodiment of the present invention will be described next with reference to FIG. 6.

In this embodiment, the second embodiment is applied to the above-described first embodiment. That is, a write preference determination unit 30A and a write preference control unit 30B are provided to perform write preference control according to the first embodiment, and a buffer accumulation amount detection unit 40 is provided to perform discard preference control according to the second embodiment.

Accordingly, if the reception rate exceeds the reception rate threshold, the write bandwidth increases as compared to the read bandwidth, and the packet write operation in a packet buffer BUF is preferentially executed.

For this reason, the packets accumulated in a register file 11 are read out at a higher speed and written in the packet buffer BUF, and the buffer accumulation amount in the register file 11 decreases. Hence, since the buffer accumulation amount in the register file 11 gradually decreases, and the write bandwidth increases, the packet loss occurrence frequency can be reduced, and occurrence of linked discard of reception packets caused by a shortage of the write bandwidth can be suppressed even if the reception rate increases after that.

In addition, if the packet buffer BUF has a free storage area, the surplus packets in the register file 11 are written in the packet buffer BUF. If the packet buffer BUF has no free storage area, the surplus packets in the register file 11 are discarded by a selector 12.

Hence, since the buffer accumulation amount in the register file 11 gradually decreases, the packet loss occurrence frequency can be reduced, and occurrence of linked discard of reception packets caused by a shortage of the write bandwidth can be suppressed even if the reception rate increases after that.

Fifth Embodiment

A packet transfer processing apparatus 10 according to the fifth embodiment of the present invention will be described next with reference to FIG. 7.

In this embodiment, the third embodiment is applied to the above-described first embodiment. That is, a write preference determination unit 30A and a write preference control unit 30B are provided to perform write preference control according to the first embodiment, and a buffer accumulation amount detection unit 40 is provided to perform write preference control according to the third embodiment.

Accordingly, if the reception rate exceeds the reception rate threshold, the write bandwidth increases as compared to the read bandwidth, and the packet write operation in a packet buffer BUF is preferentially executed.

For this reason, the packets accumulated in a register file 11 are read out at a higher speed and written in the packet buffer BUF, and the buffer accumulation amount in the register file 11 decreases. Hence, since the buffer accumulation amount in the register file 11 gradually decreases, and the write bandwidth increases, the packet loss occurrence frequency can be reduced, and occurrence of linked discard of reception packets caused by a shortage of the write bandwidth can be suppressed even if the reception rate increases after that.

If the packet buffer BUF has a free storage area, the write bandwidth increases as compared to the read bandwidth, and the packet write operation to the packet buffer BUF is preferentially executed.

For this reason, the packets accumulated in the register file 11 are read out at a higher speed and written in the packet buffer BUF, and the buffer accumulation amount in the register file 11 decreases. Hence, since the buffer accumulation amount in the register file 11 gradually decreases, and the write bandwidth increases, the packet loss occurrence frequency can be reduced, and occurrence of linked discard of reception packets caused by a shortage of the write bandwidth can be suppressed even if the reception rate increases after that.

Note that in the above-described fourth embodiment, application of the second embodiment to the first embodiment has been described, and in the above-described fifth embodiment, application of the third embodiment to the first embodiment has been described. However, the second embodiment and the third embodiment can independently be applied to the first embodiment. Hence, both the second embodiment and the third embodiment may be applied to the first embodiment.

Figure 6:
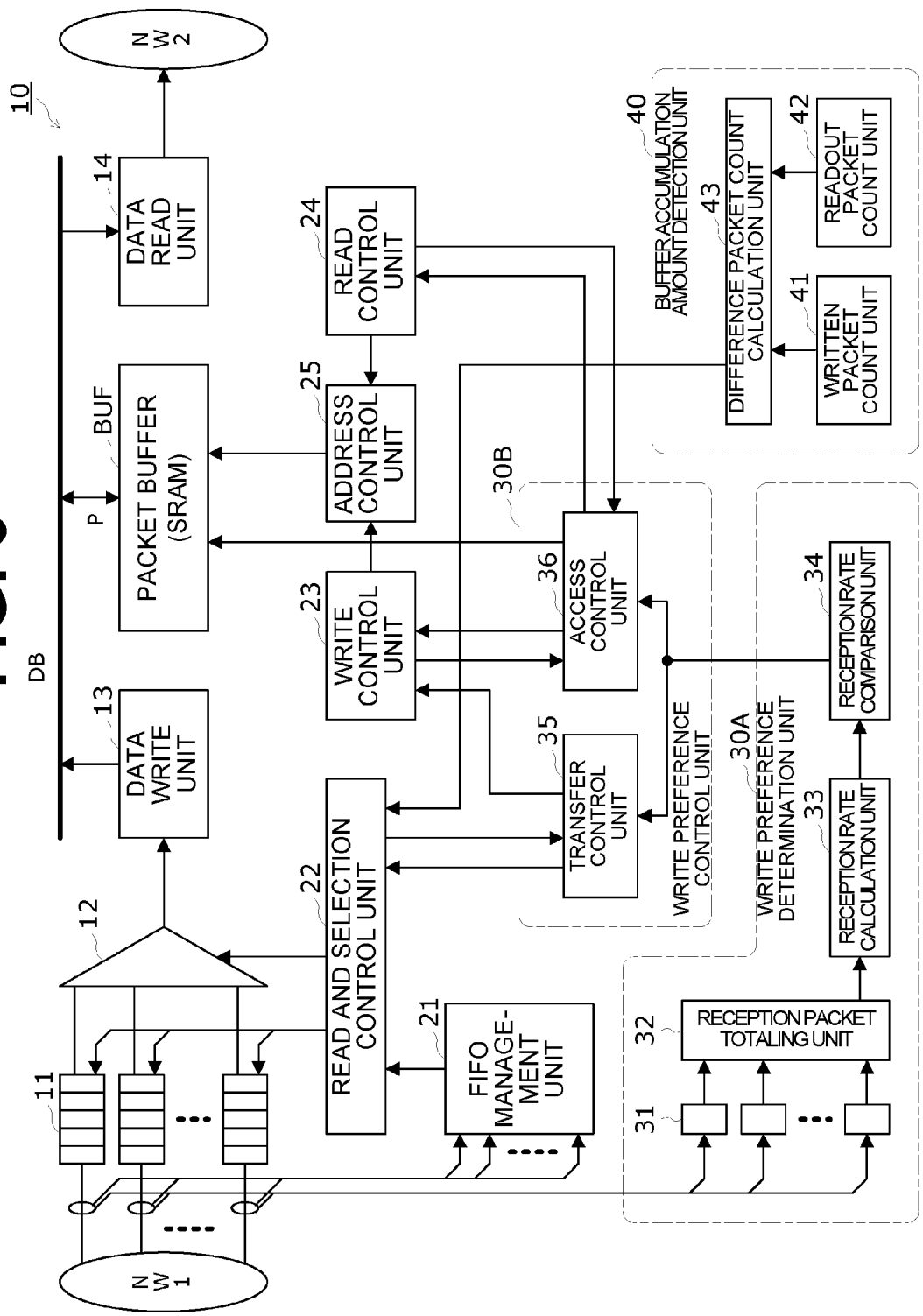
FIG. 6 is a block diagram showing the arrangement of main parts of a packet transfer processing apparatus according to the fourth embodiment.
Figure 7:
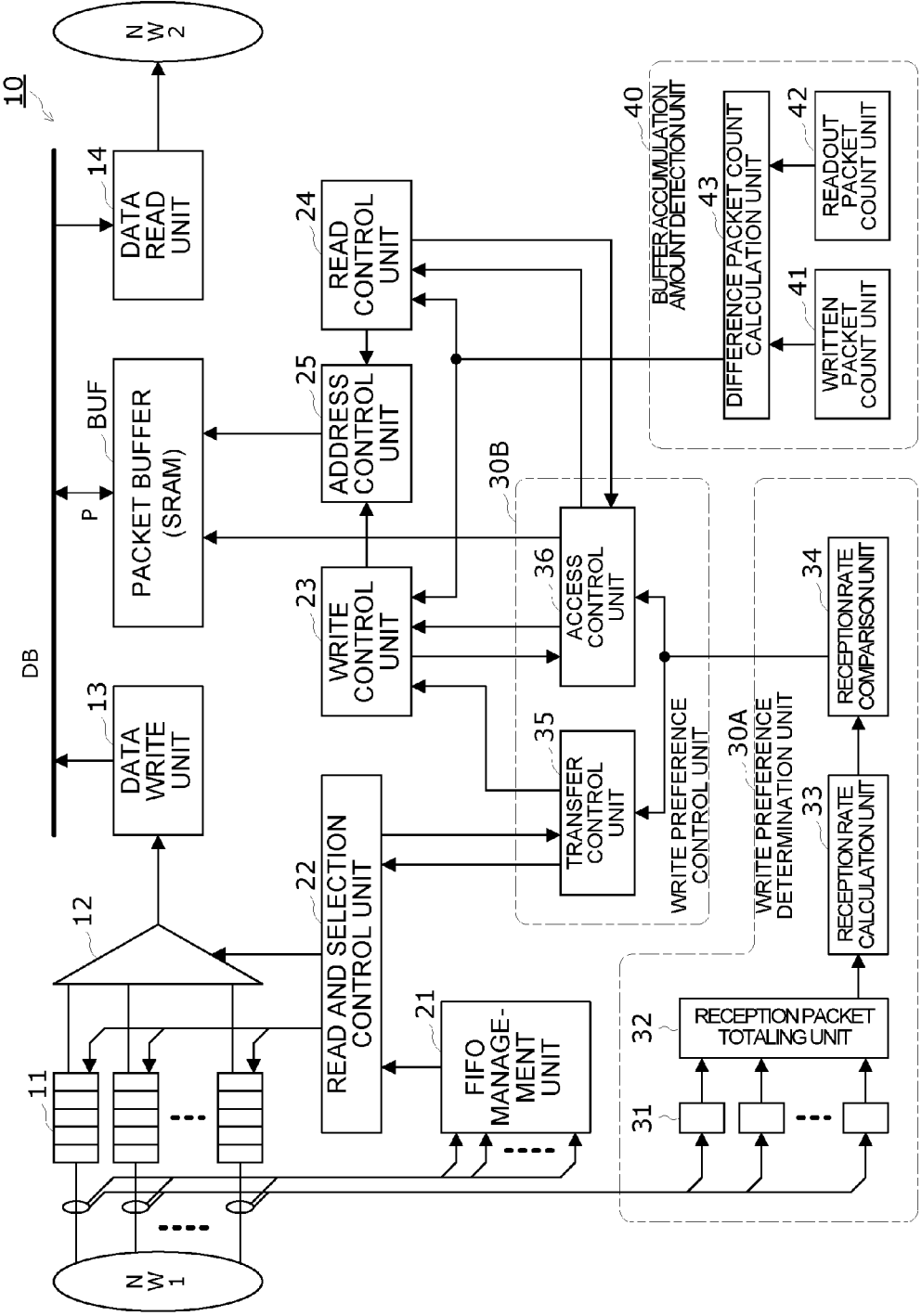
FIG. 7 is a block diagram showing the arrangement of main parts of a packet transfer processing apparatus according to the fifth embodiment.
Figure 8:
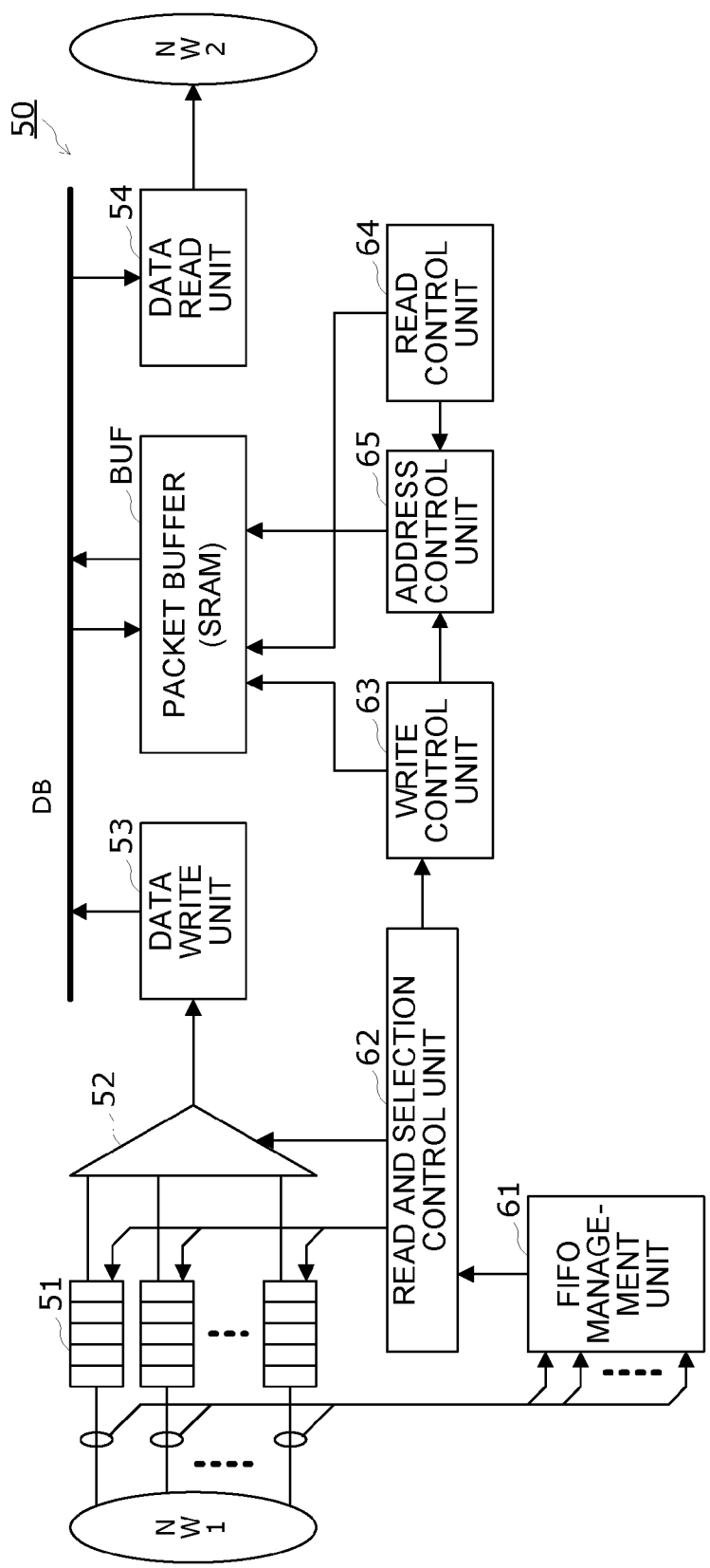
FIG. 8 is a block diagram showing the arrangement of main parts of a conventional packet transfer processing apparatus.

That is, the write preference determination unit 30A and the write preference control unit 30B are provided to perform write preference control according to the first embodiment, the buffer accumulation amount detection unit 40 shown in FIG. 6 is provided to perform discard preference control according to the second embodiment, and the buffer accumulation amount detection unit 40 shown in FIG. 7 is provided to perform write preference control according to the third embodiment. This can obtain all the effects according to the first, second, and third embodiments.

[Extension of Embodiment]

The present invention has been described above with reference to the exemplary embodiments. However, the present invention is not limited to the above exemplary embodiments. Various changes and modifications understandable by those who are skilled in the art can be done for the arrangements and details of the present invention without departing the scope of the present invention. In addition, the embodiments can arbitrarily be combined within a consistent range.

EXPLANATION OF THE REFERENCE NUMERALS AND SIGNS

10 . . . packet transfer processing apparatus, 11 . . . register file, 12 . . . selector, 13 . . . data write unit, BUF . . . packet buffer, 14 . . . data read unit, 30A . . . write preference determination unit, 30B . . . write preference control unit

The invention claimed is:

1. A packet transfer processing apparatus that concentrates a plurality of lines from a first network and connects the lines to a second network, characterized by comprising:
register files equipped for each of the lines, wherein the register files hold packets received from the respective lines;
a selector circuit that sequentially selectively outputs one of the packets read out of said register files;
a data writer circuit that writes the packet selectively output from said selector in a packet buffer;
a data reader circuit that transmits a packet read out of the packet buffer to the second network;
a write preference determinator circuit that compares a reception rate of packets received from the lines with a reception rate threshold for write preference determination, and in a case where the reception rate exceeds the reception rate threshold, determines that preference of a write operation is necessary; and
a write preference controller circuit that increases, out of a total access bandwidth of the packet buffer, a write bandwidth for a packet write operation to the packet buffer as compared to a read bandwidth for a packet read operation from the packet buffer in a case where said write preference determinator determines that the preference is necessary, thereby preferentially executing the packet write operation to the packet buffer.

2. The packet transfer processing apparatus according to claim 1, wherein, in the case where said write preference determinator circuit determines that the preference is necessary, said write preference controller circuit stops the packet read operation and executes only the packet write operation.

3. The packet transfer processing apparatus according to claim 1 or 2, further comprising:
a buffer accumulation amount detector circuit that detects a buffer accumulation amount in the packet buffer based on the number of packets written into the packet buffer and the number of packets read out of the packet buffer; and
a read and selection controller circuit that compares the buffer accumulation amount detected by said buffer accumulation amount detector with a packet holding amount in said register file and determine whether or not some or all surplus packets exceeding the write bandwidth out of the packets held in said register file can be accumulated in the packet buffer, if the surplus packets can be accumulated, read the surplus packets out of said register file and selectively output the surplus packets from said selector to said data writer, and if the surplus packets cannot be accumulated, read the surplus packets out of said register file and discard the surplus packets by said selector.

4. The packet transfer processing apparatus according to claim 1 or 2, further comprising:
a buffer accumulation amount detector circuit that detects a buffer accumulation amount in the packet buffer based on the number of packets written into the packet buffer and the number of packets read out of the packet buffer;
a write controller circuit that increases or decreases the write bandwidth in accordance with an increase/decrease in the buffer accumulation amount detected by said buffer accumulation amount detector; and
a read controller circuit that increases or decreases the read bandwidth in accordance with an increase/decrease in the buffer accumulation amount detected by said buffer accumulation amount detector.

5. A packet transfer processing apparatus that concentrates a plurality of lines from a first network and connects the lines to a second network, the packet transfer processing apparatus comprising:
register files equipped for each of the lines, wherein the register files hold packets received from the respective lines;
a selector circuit that sequentially selectively outputs one of the packets read out of said register files;
a data writer circuit that writes the packet selectively output from said selector in a packet buffer;
a data reader circuit that transmits a packet read out of the packet buffer to the second network;
a buffer accumulation amount detector circuit that detects a buffer accumulation amount in the packet buffer based on the number of packets written into the packet buffer and the number of packets read out of the packet buffer; and
a read and selection controller circuit that compares the buffer accumulation amount detected by said buffer accumulation amount detector with a packet holding amount in said register file and determines whether or not some or all surplus packets exceeding a write bandwidth for a packet write operation to the packet buffer out of the packets held in said register file can be accumulated in the packet buffer, if the surplus packets can be accumulated, reads the surplus packets out of said register file and selectively output the surplus packets from said selector to said data writer, and if the surplus packets cannot be accumulated, reads the surplus packets out of said register file and discards the surplus packets by said selector.

6. A packet transfer processing apparatus that concentrates a plurality of lines from a first network and connects the lines to a second network, the packet transfer processing apparatus comprising:
register files equipped for each of the lines, wherein the register files hold packets received from the respective lines;
a selector circuit that sequentially selectively outputs one of the packets read out of said register files;
a data writer circuit that writes the packet selectively output from said selector in a packet buffer;
a data reader circuit that transmits a packet read out of the packet buffer to the second network;
a buffer accumulation amount detector circuit that detects a buffer accumulation amount in the packet buffer based on the number of packets written into the packet buffer and the number of packets read out of the packet buffer;

a write controller circuit that increases or decreases a write bandwidth for a packet write operation to the packet buffer in accordance with an increase/decrease in the buffer accumulation amount detected by said buffer accumulation amount detector; and a read controller circuit that increases or decreases a read bandwidth for a packet read operation from the packet buffer in accordance with an increase/decrease in the buffer accumulation amount detected by said buffer accumulation amount detector.

7. A packet transfer processing method used in a packet transfer processing apparatus that concentrates a plurality of lines from a first network and connects the lines to a second network, characterized by comprising:

the step of causing register files to hold packets received from the respective lines;

the step of causing a selector to sequentially selectively output one of the packets read out of the register files;

the data write step of causing a data write unit to write the packet selectively output from the selector in a packet buffer;

the data read step of causing a data read unit to transmit a packet read out of the packet buffer to the second network;

the write preference determination step of causing a write preference determination unit to compare a reception rate of packets received from the lines with a reception rate threshold for write preference determination, and in a case where the reception rate exceeds the reception rate threshold, determine that preference of a write operation is necessary; and the write preference control step of causing a write preference control unit to increase, out of a total access bandwidth of the packet buffer, a write bandwidth for a packet write operation to the packet buffer as compared to a read bandwidth for a packet read operation from the packet buffer in a case where it is determined in the write preference determination step that the preference is necessary, thereby preferentially executing the packet write operation to the packet buffer.

8. The packet transfer processing method according to claim 7, characterized in that in the case where it is determined in the write preference determination step that the preference is necessary, in the write preference control step, the packet read operation is stopped, and only the packet write operation is executed.

9. A packet transfer processing method used in a packet transfer processing apparatus that concentrates a plurality of lines from a first network and connects the lines to a second network, characterized by comprising:

the step of causing register files to hold packets received from the respective lines;

the step of causing a selector to sequentially selectively output one of the packets read out of the register files;

the data write step of causing a data write unit to write the packet selectively output from the selector in a packet buffer;

the data read step of causing a data read unit to transmit a packet read out of the packet buffer to the second network;

the buffer accumulation amount detection step of causing a buffer accumulation amount detection unit to detect a buffer accumulation amount in the packet buffer based on the number of packets written into the packet buffer and the number of packets read out of the packet buffer; and the read and selection control step of causing a read and selection control unit to compare the buffer accumulation amount detected in the buffer accumulation amount detection step with a packet holding amount in the register file and determine whether or not some or all surplus packets exceeding a write bandwidth for a packet write operation to the packet buffer out of the packets held in the register file can be accumulated in the packet buffer, if the surplus packets can be accumulated, read the surplus packets out of the register file and selectively output the surplus packets from the selector to the data write unit, and if the surplus packets cannot be accumulated, read the surplus packets out of the register file and discard the surplus packets by the selector.

10. A packet transfer processing method used in a packet transfer processing apparatus that concentrates a plurality of lines from a first network and connects the lines to a second network, characterized by comprising:

the step of causing register files to hold packets received from the respective lines;

the step of causing a selector to sequentially selectively output one of the packets read out of the register files;

the data write step of causing a data write unit to write the packet selectively output from the selector in a packet buffer;

the data read step of causing a data read unit to transmit a packet read out of the packet buffer to the second network;

the buffer accumulation amount detection step of causing a buffer accumulation amount detection unit to detect a buffer accumulation amount in the packet buffer based on the number of packets written into the packet buffer and the number of packets read out of the packet buffer;

the write control step of causing a write control unit to increase or decrease a write bandwidth for a packet write operation to the packet buffer in accordance with an increase/decrease in the buffer accumulation amount detected in the buffer accumulation amount detection step; and the read control step of causing a read control unit to increase or decrease a read bandwidth for a packet read operation from the packet buffer in accordance with an increase/decrease in the buffer accumulation amount detected in the buffer accumulation amount detection step.

* * * * *